(12) United States Patent
Milanowski et al.

(10) Patent No.: US 6,768,859 B2
(45) Date of Patent: Jul. 27, 2004

(54) EQUIPMENT BOX, IN PARTICULAR A SPLICE BOX

(75) Inventors: Michel Milanowski, Anserville (FR); Alain Vincent, Joilly (FR)

(73) Assignee: Nexans (FR)

( * ) Notice: Subject to any disclaimer, the term of this patent is extended or adjusted under 35 U.S.C. 154(b) by 0 days.

(21) Appl. No.: 10/154,481

(22) Filed: May 22, 2002

(65) Prior Publication Data

US 2002/0191941 A1 Dec. 19, 2002

(30) Foreign Application Priority Data

May 23, 2001 (FR) .............................. 01 06826

(51) Int. Cl.[7] .............................................. G02B 6/00
(52) U.S. Cl. .................................................... 385/134
(58) Field of Search ................................. 385/134, 135, 385/136, 138; 439/587, 589, 556, 559

(56) References Cited

U.S. PATENT DOCUMENTS

| | | | |
|---|---|---|---|
| 4,684,190 A | * | 8/1987 | Clark et al. ................. 439/587 |
| 5,803,759 A | * | 9/1998 | Griffith et al. .............. 439/274 |
| 5,862,290 A | * | 1/1999 | Burek et al. ................ 385/135 |
| 5,980,316 A | * | 11/1999 | Shinchi ....................... 439/587 |
| 6,190,203 B1 | * | 2/2001 | Murakami et al. .......... 439/587 |
| 6,201,922 B1 | * | 3/2001 | Milanowski et al. ........ 385/135 |
| 6,266,471 B1 | * | 7/2001 | Burek et al. ................ 385/137 |
| 6,338,651 B1 | * | 1/2002 | Svette et al. ................ 439/559 |

FOREIGN PATENT DOCUMENTS

| | | | | |
|---|---|---|---|---|
| DE | 7516723 | | 2/1977 | ................... 15/18 |
| EP | 0403937 | | 12/1990 | ................... 15/13 |
| EP | 0543350 | | 5/1993 | ................... 15/13 |
| EP | 0 942 507 | * | 9/1999 | ......... H02G/15/117 |

OTHER PUBLICATIONS

French Search Report dated Feb. 20, 2002.

* cited by examiner

*Primary Examiner*—Tulsidas C. Patel
(74) *Attorney, Agent, or Firm*—Sofer & Haroun, LLP

(57) ABSTRACT

The present invention relates to an equipment box, in particular a splice box, the box including an orifice for inserting a cable (3) in a through configuration or in a bight configuration, the orifice being associated with at least one closure portion (5, 15) for closing the orifice in leaktight manner and provided with entry tube means for receiving conventional leaktight fixing members for a cable. The closure portion (5, 15) is complementary in shape to the orifice and is provided with an overmolded gasket (6, 16) co-operating with a gasket-bearing surface on part of the box (1).

10 Claims, 4 Drawing Sheets

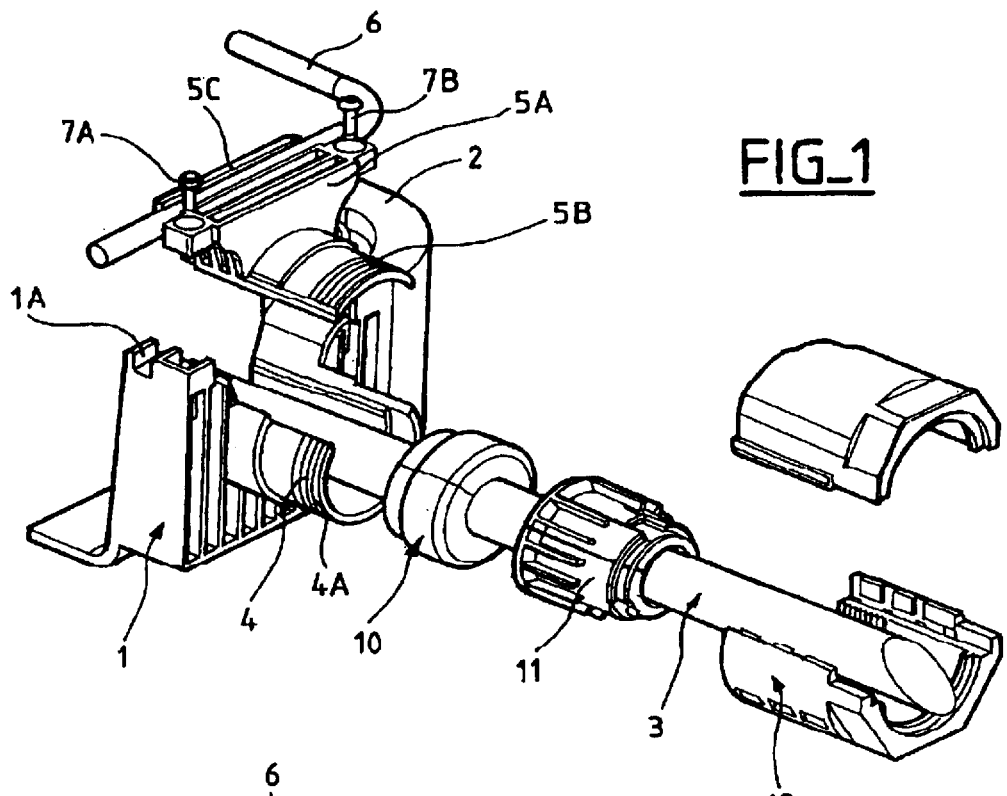
FIG_1
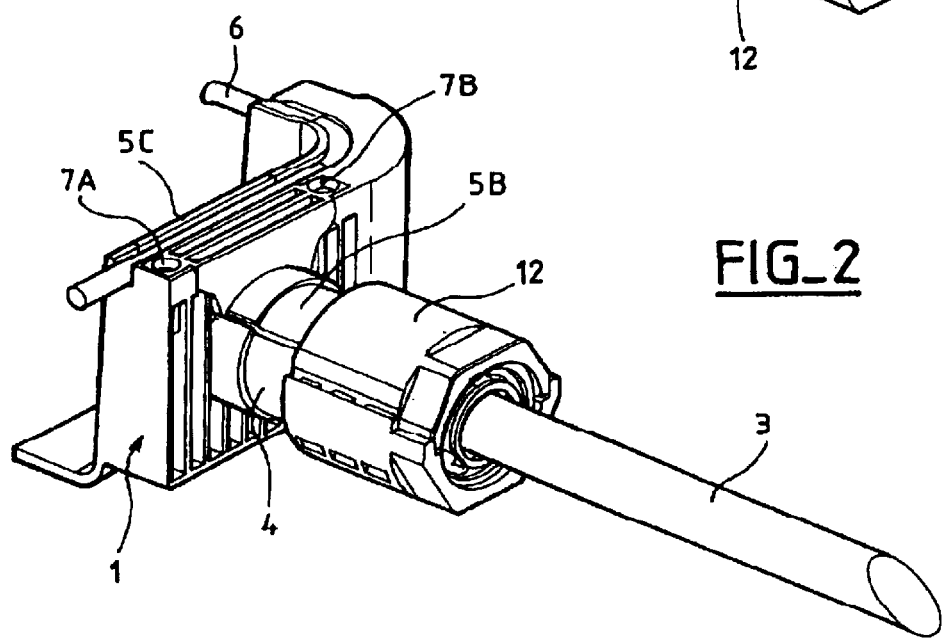
FIG_2

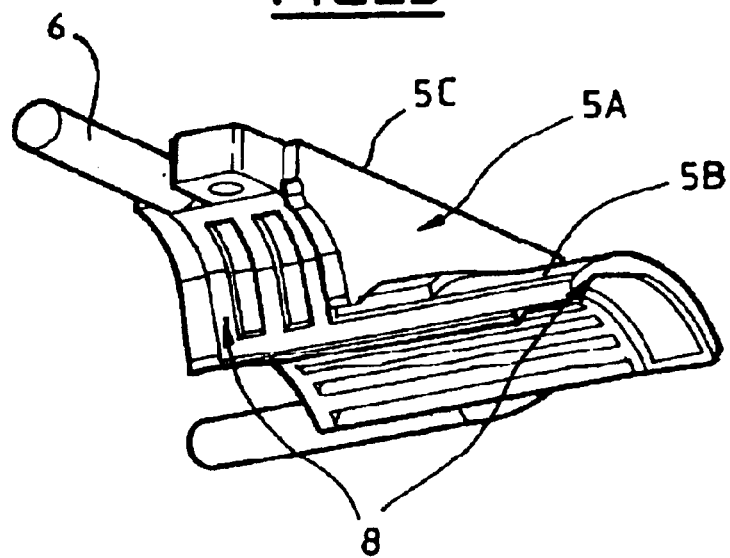
FIG_3
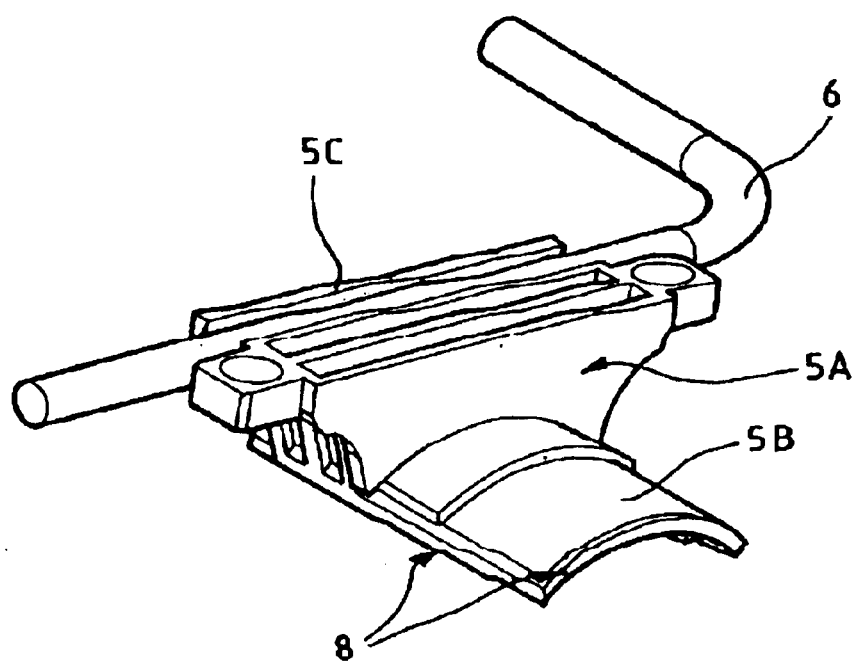
FIG_4

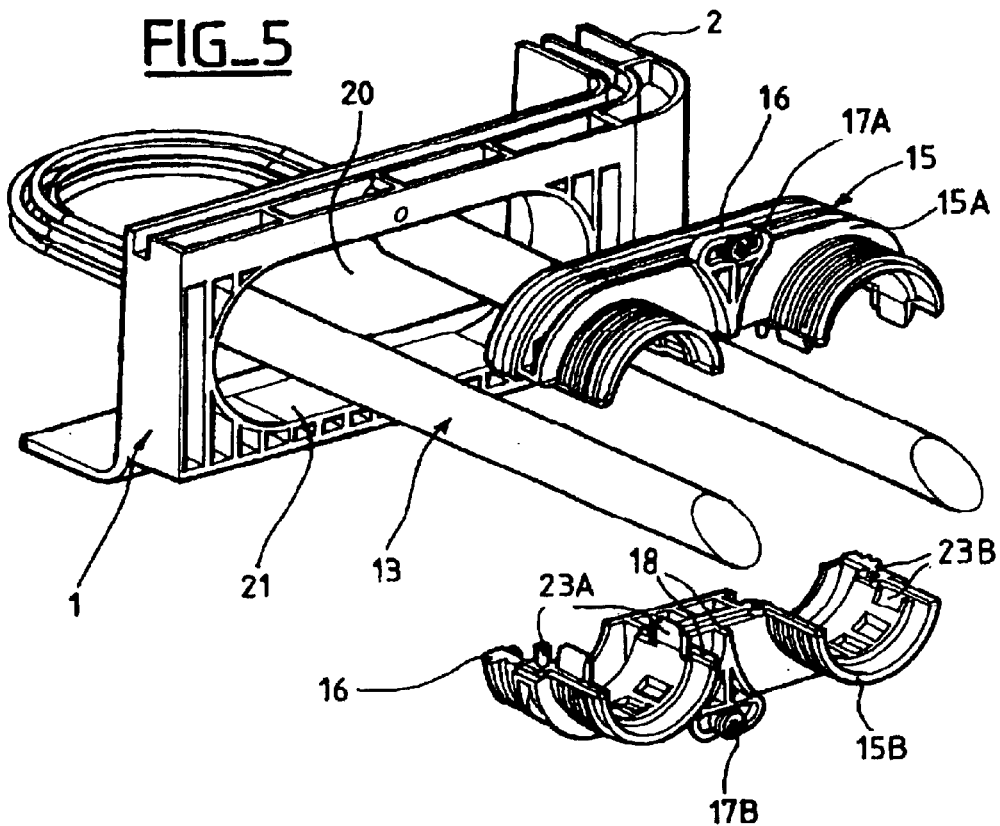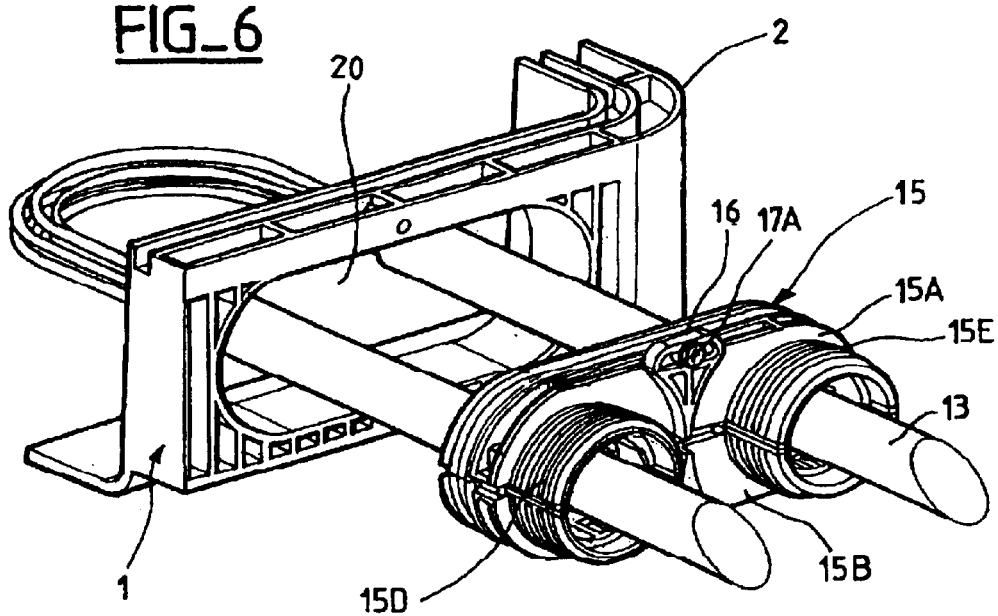

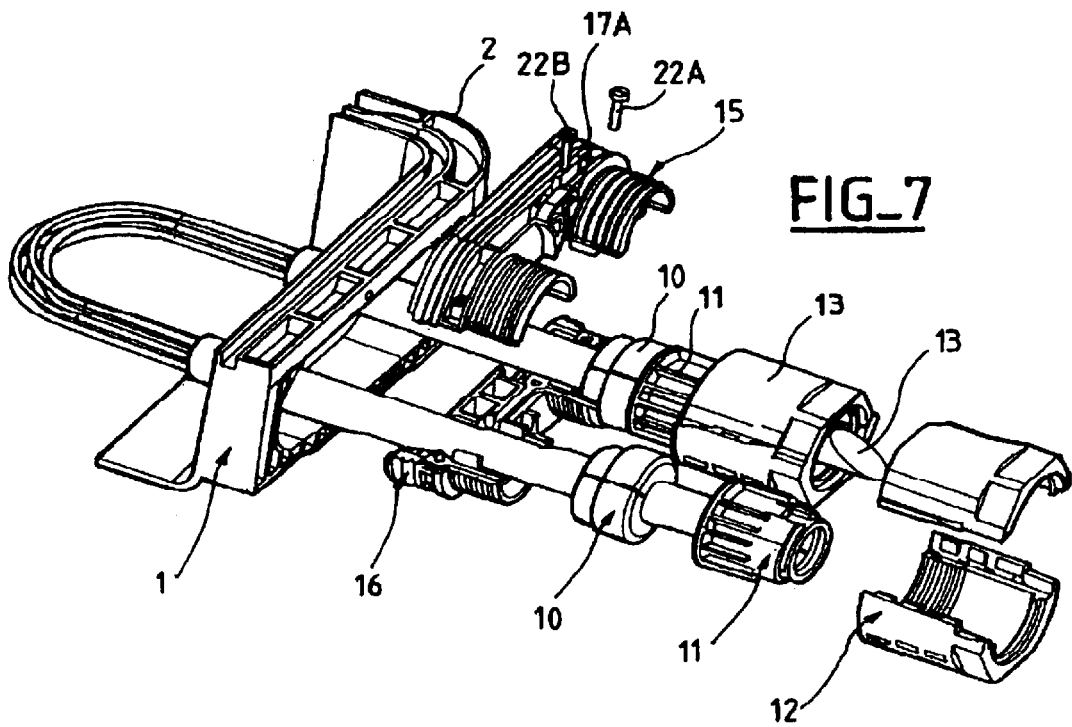
FIG_7
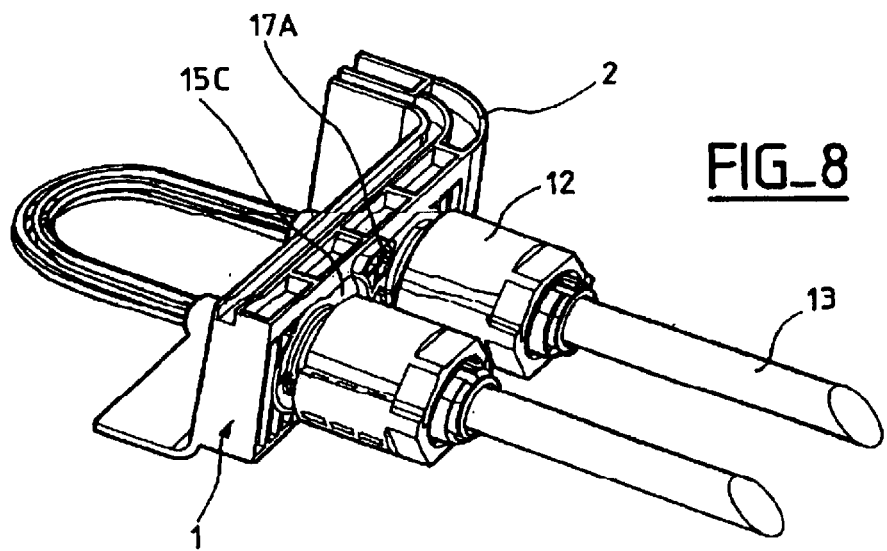
FIG_8

EQUIPMENT BOX, IN PARTICULAR A SPLICE BOX

RELATED APPLICATIONS

This application is related to and claims the benefit of priority from French Patent Application No. 01 06826, filed on May 23, 2001, the entirety of which is incorporated herein by reference.

FIELD OF THE INVENTION

The present invention relates to an equipment box, in particular a splice box.

More precisely, the invention relates to an equipment box, in particular a splice box, having an orifice for inserting a cable, either in a through configuration or in a bight configuration, the orifice being associated with a closure portion for closing the orifice in leaktight manner and being provided with means for receiving conventional leaktight fixing members for a cable.

BACKGROUND OF THE INVENTION

The boxes that contain the fittings needed to connect cables to equipment at determined locations along cables are conventionally designed to be leaktight. It is advantageous to preserve as much is possible the continuity of electrical and/or optical conductors in a cable having tapping points made along it for connection to equipment. This leads to leaktight boxes being provided that allow a cable to pass in a through configuration via two orifices made in two opposite walls of a box, or a cable to pass in a U-shaped or "bight" configuration via a single opening.

Boxes arranged for a through configuration generally have the two orifices needed for passing the cable formed in the vicinity of a junction between two separable portions of the box, for example in the form of notches opening out into a bearing zone where a lid bears against a case of the box.

It is then possible to insert a cable so that it passes through the box via the notches without it being necessary to thread one end of the cable through an orifice, which rapidly becomes unacceptable once the cable is of significant length. Furthermore, it commonly happens that such a box is used to establish distribution from a fixed cable that has already been installed, which makes it necessary to be able to put the box into place without moving the cable.

Making a leaktight box including a cable passage that opens out to a junction zone between portions of the box requires sealing means to be installed in order to guarantee leaktightness in the zone where the cable meets the two portions of the box.

European patent document EP 0 942 507 describes such a sealing device for a straight cable in a semi-tubular access, the device sealing the box at the access opening. That device includes an additional cover member which is provided both with a longitudinal rib for closing the semi-tubular access, and with a transverse groove on the rim for receiving a peripheral gasket, cable packing, and a front cable guide that receives thrust from a presser member acting on the packing.

It is difficult to obtain and to conserve so-called "triple point" sealing between the elements constituting the cable and the two meeting portions of the box, because of the need for those elements to co-operate with one another, in particular by being in alignment, and specifically in the box that is opened again at a later date.

Boxes that are arranged to receive a bight of cable generally have an elongate opening formed in a wall of the case for receiving a U-shaped bight of the cable inside the box. The periphery of such an opening forms a gasket-bearing surface, and it is surrounded at each end by a respective external entry tube carried by the box. During assembly, the opening is closed by a gasket comprising a strip for closing the opening together with two perforated tubular pads projecting from the ends of the strip.

European patent document EP 0 942 506 discloses such a sealing device for a bight of cable received in a box through a peripherally closed access provided with two facing and spaced-apart semi-tubular portions of entry tube. The sealing device comprises a single gasket for sealing both sections of the bight of cable inside the access, and pressure-applying means adapted to close the entry tube portions and to press against the gasket so as to obtain the desired sealing effect.

Such as sealing device requires a gasket of special shape in order to be able to close and seal said access.

OBJECTS AND SUMMARY OF THE INVENTION

The object of the invention is to provide a sealing device which enables a conventional cable joint to be used, i.e. a split cylinder, regardless of whether the cable is in a through or a bight configuration.

The invention provides an equipment box, in particular a splice box, having an orifice for inserting a cable disposed in a bight configuration, the opening being associated with at least one leaktight closure portion for this orifice provided with entry tube means for receiving conventional leaktight fixing members for a cable, said closure portion being complementary in shape to the orifice and being provided with an overmolded gasket co-operating with a gasket-bearing surface on a portion of the box, the box being characterized in that said insertion orifice is elongate in shape, being provided in a wall of the box, and is surrounded by a bearing surface for a gasket, and said closure portion is constituted by two identical parts which, when assembled together, form a closure wall for said orifice, which wall carries two entry tubes for receiving conventional leaktight fixing members for a cable and carries on its periphery an overmolded gasket.

In a preferred embodiment, each of said identical parts constitutes a half-wall provided with two half entry tubes.

Preferably, said identical parts are provided on their adjoining edges with respective overmolded gaskets and with means for positioning by mutual engagement.

The invention also provides an equipment box, in particular a splice box, having an orifice for inserting a cable disposed in a through configuration, the opening being associated with at least one leaktight closure portion for this orifice provided with entry tube means for receiving conventional leaktight fixing members for a cable, said closure portion being complementary in shape to the orifice and being provided with an overmolded gasket co-operating with a gasket-bearing surface on a portion of the box, which box comprises an open first portion or "case" with an opening closed by a second portion or "lid" that bears against a gasket positioned at the margin of the opening, the box being characterized in that said insertion orifice is in the form of a notch made in the margin of the case and is provided at the bottom of the notch with a segment of entry tube, and said closure portion comprises a complementary segment of entry tube and a wall for closing said notch, said wall carrying an overmolded gasket designed to be received in a bearing zone of the lid.

In a preferred embodiment, said gasket is a segment of O-ring gasket whose ends are designed to be received in a groove in the box and are placed end to end with gasket segments in order to provide sealing between the box and the lid.

Preferably, said gasket is an O-ring designed to be received in a groove of the box in order to provide sealing between the box and the lid.

Advantageously, said closure portion is provided on its edges meeting said insertion orifice with overmolded gaskets.

Said closure portion can be made out of the same material as the box and it can be assembled to the box by screws.

In this way, once the closure portion has been mounted in the insertion orifice, it completes the box in conventional manner, forming at least one entry tube fixed thereto and receiving a cable in leaktight manner by a conventional assembly comprising packing, a cable guide, and a packing box or presser.

Standard split packing can be used. Similarly, the cable guide and the packing box used for fixing the cable in the entry tube in leaktight manner are quite conventional.

Furthermore, this type of arrangement is equally suitable for mounting a cable in a through configuration or in a bight configuration. The same assembly of packing, a cable guide, and a packing box can be used in both cases. This greatly reduces the cost of fittings, since only one kind of sealing kit is needed.

In addition, such an arrangement makes it possible to provide sealing outside the box rather than inside, and consequently sealing can be obtained over a broad range of cable diameters up to diameters that are large.

Finally, an overmolded gasket provides excellent sealing while also making assembly easier.

BRIEF DESCRIPTION OF THE DRAWINGS

The invention is described below in greater detail with reference to the drawings, which show two preferred embodiments of the invention.

FIG. 1 is a perspective view of a box and a sealing assembly of the invention prior to assembly, for a cable in a through configuration.

FIG. 2 is a similar view after assembly.

FIGS. 3 and 4 are corresponding fragmentary perspective views.

FIG. 5 is a perspective view of a box of the invention prior to assembly, for a cable in a bight configuration.

FIG. 6 is a similar view during an assembly step.

FIG. 7 is a perspective view of a box and a sealing assembly of the invention prior to assembly, for a cable in a bight configuration.

FIG. 8 is a similar view after assembly.

DETAILED DESCRIPTION OF THE INVENTION

In conventional manner, boxes that contain the fittings needed for connecting equipment at determined positions along a cable are designed to be sealed. It is advantageous to preserve as much as possible the continuity of the electrical and/or optical conductors in a cable having tapping points for equipment formed therealong. This has thus lead to leaktight boxes being made that allow a cable to pass through them via two orifices made in two opposite walls of the box, or that allow a cable folded into a U-shape constituting a "bight" to pass in and out through a single opening.

Such a box 1 is shown in part in the figures. In conventional manner, it comprises an open first portion or "case" (shown in part only) having an opening which is closed by a second portion or "lid" (not shown) pressing against a gasket positioned at the margin 2 of the opening. Such a box is described in detail in European patent documents EP 0 942 506 and EP 0 942 507.

FIGS. 1 to 4 show a first variant embodiment of the invention corresponding to a through cable configuration.

A side wall of the box one has an orifice for receiving the cable 3, the orifice being in the form of a notch in the margin of the case, with the bottom of the notch being provided with an outwardly-extending gutter-shaped portion of an entry tube 4.

The notch is associated with a closure portion 5 for leaktight closure of this orifice and it is provided with entry tube means for receiving conventional leaktight cable-fixing members. The closure portion 5 comprises a closure wall 5 for said notch and a gutter-shaped segment of entry tube 5B complementary in shape to the segment 4 carried by the box 1. This closure portion 5 can be made out of the same material as the box 1, i.e. is a general rule out of plastics material. In practice, it is preferable to select a plastics material that is filled, for example with glass fibers, so as to provide it with mechanical strength.

The size of the wall 5A is such that its top edge 5C comes into alignment with the margin 2 of the case, once assembled. This top edge 5C has a groove carrying an overmolded O-ring type gasket 6 designed to be received in the margin zone of the case in a corresponding groove 1A.

In the embodiment shown, this O-ring gasket 6 comprises a segment only, and once the closure portion 5 has been put into place, the gasket 6 comes into line with other gasket segments of conventional design already in place on the box and providing sealing between the box and the lid.

In another embodiment, the gasket 6 can be a complete O-ring for the box, and once the closure portion 5 is in place, it can be received in the groove around the entire periphery of the margin of the box 1 in order to provide sealing between the box and the lid.

The closure portion 5 is assembled to the box 1 by screws, preferably by two screws 7A and 7B passing through two bores provided in said top edge 5C and screwed into the margin 2 of the case.

At its edges that join with the insertion notch, the closure portion 5 is provided with overmolded sealing gaskets 8.

Once the closure portion 5 has been assembled to the box 1, it reconstitutes a tubular arrangement similar to the entry tube conventionally molded in the wall of the box for receiving the conventional leaktight fixing members for a cable as constituted by packing 10, a cable guide 11, and a packing box 12 screwed onto threads 4A made at the end of the entry tube constituted by the segments 4 and 5B.

The overmolded arrangement of the gasket 6 provides excellent leaktightness in the margin zone between the case and the lid, thereby mitigating the triple point sealing problem since only two parts need to be adjusted relative to each other instead of three.

FIGS. 5 to 8 show a second variant embodiment of the invention corresponding to a configuration in which the cable forms a bight.

A side wall of the box 1 has an insertion orifice 20 for the cable 13, the orifice being elongate in shape and surrounded by a gasket-bearing surface 21 for receiving a gasket.

This orifice 20 is associated with a leaktight closure portion 15 for this orifice provided with tubular means for receiving the conventional leaktight fixing members for a cable. The closure portion 15 is complementary in shape to the orifice 20. This closure portion 15 can be made out of the same material as the box 1, i.e. as a general rule out of plastics material. In practice, it is preferably made of a plastics material that is filled, e.g. with glass fibers, so as to provide it with mechanical strength.

The closure portion 15 is made up of two identical parts 15A and 15B, each constituted by a half-wall provided with two half entry tubes, which parts, once assembled together, form a closure wall 15C for the orifice 20 carrying two entry tubes 15D and 15E for receiving conventional leaktight fixing members for a cable, and carrying on its periphery an overmolded gasket 16 for co-operating with the gasket-bearing surface 21 of the box.

Said parts 15A and 15B are assembled together by screws, preferably by mean of each of them carrying two lateral screws 22A and 22B. The closure portion 15 built-up in this way is assembled to the box 1, likewise by means of screws, preferably by two front screws 17A and 17B screwed into the side wall of the case.

The adjoining edges of these identical parts 15A and 15B are provided with overmolded gaskets 18 and with an assembly for ensuring mutual positioning, preferably an arrangement of tenons 23A and corresponding holes or notches 23B.

Once assembled, the closure portion 15 on the box 1 reconstitutes an entry tube arrangement similar to the arrangement conventionally molded on the box for receiving the conventional leaktight fixing members of the two sections of cable as constituted by packing 10, the cable guide 11, and a packing box 12 screwed onto the thread 4A formed at the end of the entry tube made up of the segments 15D and 15E.

It is claimed:

1. An equipment box, for housing a spliced cable in a bight configuration, said equipment box comprising:
    an orifice for inserting a cable, in the form of an elongate shape;
    a corresponding leaktight closure portion, complementary in shape to said orifice, said corresponding leaktight closure portion constituted by two identical parts that, when assembled together, form a closure wall for said orifice, said closure wall having two entry tubes for receiving conventional leaktight fixing members for a cable; and
    an overmolded gasket, carried on said periphery of said leaktight closure portion, said overmolded gasket configured to cooperate with a gasket bearing zone on said equipment box.

2. An equipment box according to claim 1, where each of said identical parts of said corresponding leaktight closure portion constitutes a half-wall provided with two half entry tubes.

3. An equipment box according to claim 1, wherein said corresponding leakproof closure portion is made of the same material as the equipment box.

4. An equipment box according to claim 1, wherein said corresponding leakproof closure portion is assembled to said equipment box by screws.

5. An equipment box according to claim 2, wherein said identical parts of said corresponding leakproof closure portion are provided on their adjoining edges with a second set of overmolded gaskets and with an assembly means for mutual positioning by engagement.

6. An equipment box, for housing a spliced cable in the through configuration having an open first portion or case with an opening and closed by a second portion or lid, said equipment box comprising:
    an orifice for inserting a cable, in the form of a notch, made in the margin of the case, and is provided at the bottom of the notch with a first segment entry tube;
    a corresponding leaktight closure portion, complementary in shape to said orifice, provided with a corresponding second entry tube means for receiving conventional leaktight fixing members for a cable, and a wall, said corresponding entry tube means and said wall configured to close said orifice; and
    an overmolded gasket, carried in said wall of said leaktight closure portion, said gasket being a segment of an O-ring gasket, such that its ends are designed to be received in a groove in said case of said equipment box to be placed end to end with the other segments of said O-ring gasket, said overmolded gasket configured to cooperate with a gasket bearing zone on said lid portion of said equipment box in order to provide sealing between said case of said equipment box and said lid.

7. An equipment box according to claim 6, wherein said overmolded gasket is a complete O-ring designed to be received in said groove in said case of said equipment box in order to provide sealing between said case of said equipment box and said lid.

8. An equipment box according to claim 6, wherein said corresponding leakproof closure portion is provided on its edges which meet with said insertion orifice, with a second series of overmolded gaskets.

9. An equipment box according to claim 6, wherein said corresponding leakproof closure portion is made the same material as the equipment box.

10. An equipment box according to claim 6, wherein said corresponding leakproof closure portion is assembled to said equipment box by screws.

* * * * *